(No Model.)

W. J. GOING.
SUPPORT FOR INCANDESCENT LAMPS.

No. 598,220. Patented Feb. 1, 1898.

Witnesses.
Mark W. Dewey
H. M. Seamans

Inventor.
William J. Going
By C. H. Duell
his Attorney.

UNITED STATES PATENT OFFICE.

WILLIAM JOSEPH GOING, OF AMSTERDAM, NEW YORK, ASSIGNOR OF ONE-HALF TO LEONARD WELDON, OF SAME PLACE.

SUPPORT FOR INCANDESCENT LAMPS.

SPECIFICATION forming part of Letters Patent No. 598,220, dated February 1, 1898.

Application filed July 21, 1897. Serial No. 645,329. (No model.)

*To all whom it may concern:*

Be it known that I, WILLIAM JOSEPH GOING, of Amsterdam, in the county of Montgomery, in the State of New York, have invented new and useful Improvements in Supports for Incandescent Lamps, of which the following, taken in connection with the accompanying drawings, is a full, clear, and exact description.

My invention relates to adjustable supports or brackets for incandescent lamps and other light devices; and the object is to provide a simple and inexpensive support that may be easily and quickly adjusted universally.

To this end my invention consists in the combination, with a bracket having a spindle, of a segment of a disk fulcrumed on the spindle at right angles to the axis of the disk, a yoke swiveled on the said spindle to move universally, a tube having a threaded end passing through the free end of the yoke, and a bearing on the end of the tube to engage the periphery of the disk; and my invention consists in certain other combinations of parts hereinafter described, and specifically set forth in the claims.

Figure 1:
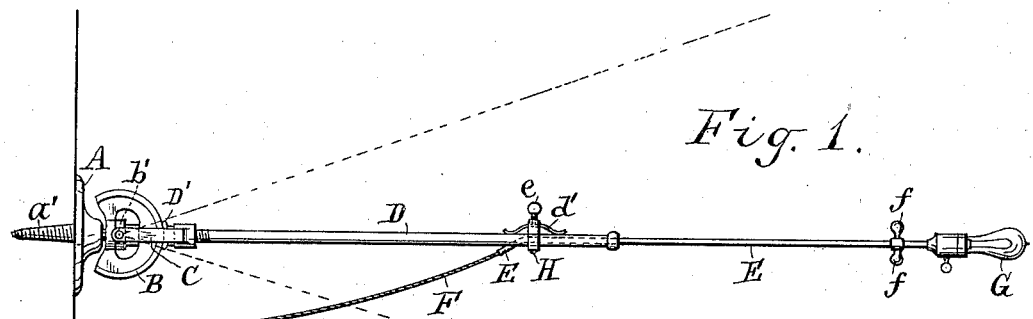
Figure 2:
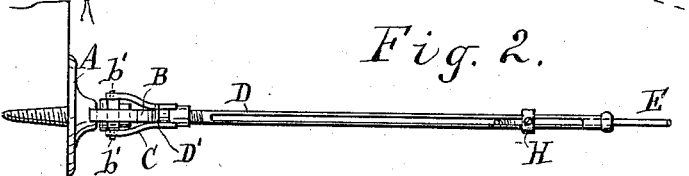
Figure 3:
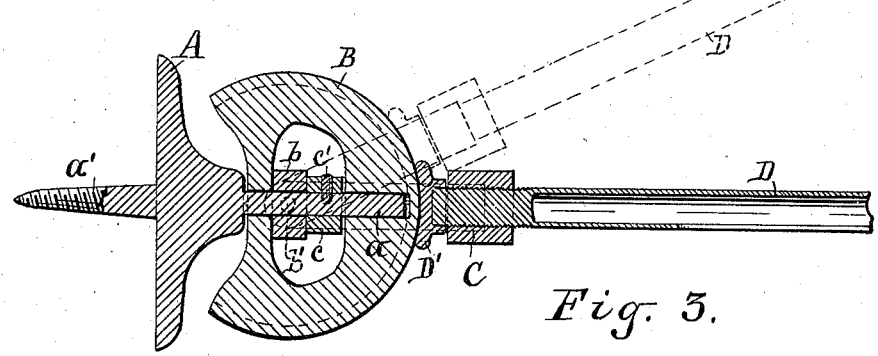
Figure 4:
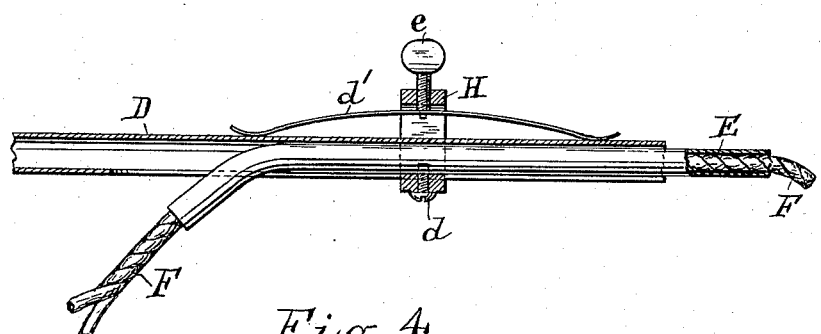

In the drawings hereto annexed and forming a part of this specification, Figure 1 is a side elevation of my improved adjustable support fixed to a side wall. Fig. 2 is a top plan view of a portion of the same with the slotted side of the tube uppermost. Fig. 3 is an enlarged sectional view of that portion of the bracket nearest the wall, and Fig. 4 shows the adjustable tension device for the inner tube.

Referring specifically to the drawings, A is the bracket, having the spindle $a$ projecting from its front side in line with a screw $a'$, which enters the wall. Several screws or nails may be substituted for the single integral screw, if desired.

B is a portion or segment of a disk. About two-thirds of the disk is employed, the incomplete or flattened side being turned toward the bracket and provided with an aperture extending at right angles to the axis of the disk to receive the spindle of the bracket. The central portion of the disk is removed or open to permit two collars or rings to be mounted upon the spindle. One of said collars $b$ is provided with projections $b'$ $b'$, extending from diametrically opposite sides, upon which the yoke C is fulcrumed. The other collar $c$ is secured rigidly to the spindle $a$ by means of a pin $c'$ and serves as a bearing for the other collar when the same is drawn toward the periphery of the disk, as hereinafter explained.

The yoke C extends from the projections $b'$ $b'$ on both sides of the disk and beyond its periphery, where it is provided with a threaded aperture, the axis of which radiates from the periphery of the disk and through which the outer tube D of the extensible part of the support extends.

When the tube is slightly unscrewed or does not bear upon the periphery of the disk, said tube, together with the yoke C, may be turned in any direction from the bracket, for then all the parts are loose. When the tube is turned or moved to extend in the desired direction, by simply turning the tube D on its axis or screwing it into the yoke C its end will be forced against the periphery of the disk, the collar $b$ will be drawn toward the collar $c$, and all the movable parts will be held rigidly in place.

Instead of having the end of the tube which is shown solid bear directly upon the disk I preferably provide a separable bearing D', having a recess for the end of the tube and a concave bearing for the periphery of the disk, so that the device will work easily.

When it is desired to raise or lower the tube D, the disk lies in a vertical plane; but when the tube is to be moved to one side or the other the disk lies in a horizontal plane or is inclined between these positions, as desired. The tube D is slotted longitudinally on one side to permit a small yoke H to be secured by a screw $d$ to the inner tube E and to slide on the outer tube when the inner tube is moved in or out. The slide or yoke D' is provided with a curved spring $d'$, which bears with its ends upon the tube D, and is adjusted by means of a screw $e$, passing through the yoke and bearing in a cavity in the center of the spring. The inner tube E has its inner end preferably bent to pass through the slot in the outer tube, so that there will be no wear upon the flexible conducting-cord F, passing through the tube upon the side walls of the slot, when the inner tube is moved.

Figure 1 shows an ordinary incandescent lamp G and its socket on the free end of the inner tube E. The projections *f* serve as a handle or means for operating the inner tube or for rotating the outer tube, and in fact as a means for operating the device generally, as will be obvious.

Having described my invention, what I claim as new, and desire to secure by Letters Patent, is—

1. In an adjustable support, the combination with a bracket having a spindle, a portion of a disk fulcrumed on the spindle at right angles to the axis of the disk, a yoke swiveled on the said spindle to move universally, a tube having a threaded end passing through the free end of the yoke, and a bearing on the end of the tube to engage the periphery of the disk, as set forth.

2. In an adjustable support, the combination with a bracket having a spindle projecting from its front face, a segment of a disk fulcrumed diametrically on the spindle, a yoke swiveled on the said spindle to move universally, a tube having a threaded end passing through the free end of the yoke, and a bearing-piece between the end of the tube and the periphery of the disk, substantially as described and shown.

3. In an adjustable support, the combination with a bracket having a spindle projecting from its front face, a segment of a disk fulcrumed diametrically on the spindle, said disk having an opening in its center, a collar in the opening secured to the spindle, a second collar in the opening mounted to turn on the spindle, said collar having projections on diametrically opposite sides, a yoke fulcrumed on said projections and extending beyond the periphery of the disk, a tube having a threaded end passing through the free end of the yoke, and a bearing-piece between the end of the tube and the periphery of the disk, substantially as described and shown.

4. In an adjustable support, the combination with a bracket having a spindle, a portion of a disk fulcrumed on the spindle at right angles to the axis of the disk, a yoke swiveled on the said spindle to move universally, a tube having a threaded end passing through the free end of the yoke, said tube being slotted longitudinally, a tube within the outer tube connected to the latter through the slot, and a conducting-cord passing through the said slot and through the inner tube, substantially as described and shown.

5. In an adjustable support, the combination with a bracket having a spindle, a portion of a disk fulcrumed on the spindle at right angles to the axis of the disk, a yoke swiveled on the said spindle to move universally, a tube having a threaded end passing through the free end of the yoke, said tube being slotted longitudinally, a tube within the outer tube connected to the latter through the slot, a conducting-cord passing through the tubes, a tension device between the tubes, a handle, and an incandescent lamp carried on the end of the inner tube, as set forth.

In testimony whereof I have hereunto signed my name.

WILLIAM JOSEPH GOING. [L. S.]

Witnesses:
H. V. BURKE,
FLORENCE J. SULLIVAN.